W. F. BATEMAN.
POWER TRANSMISSION MECHANISM.
APPLICATION FILED JAN. 6, 1912.
1,331,475. Patented Feb. 17, 1920.
2 SHEETS—SHEET 2.
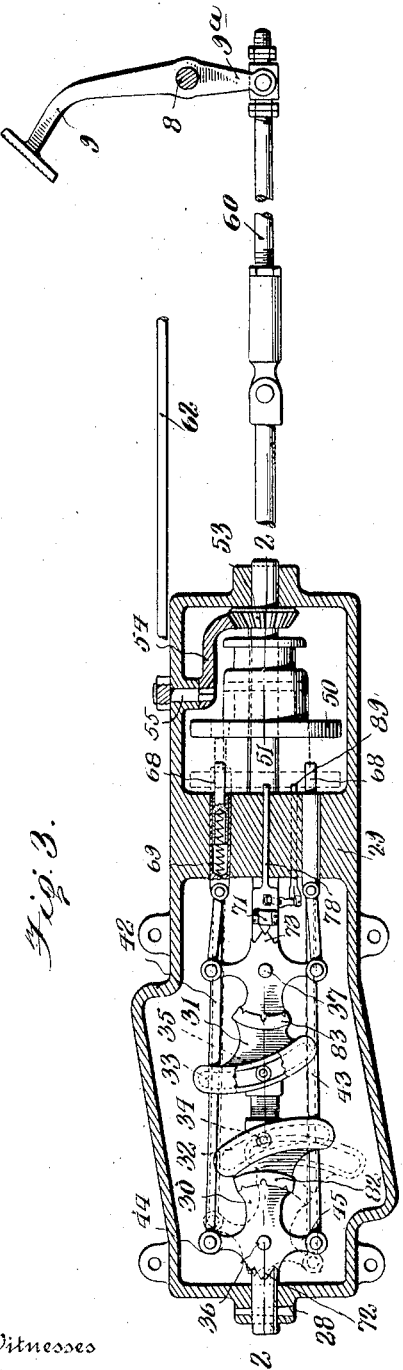
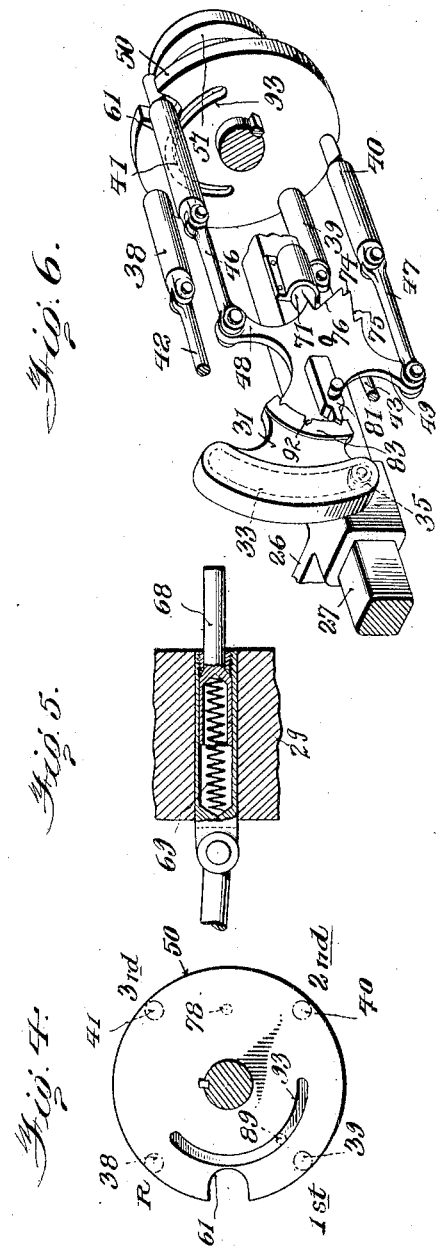
Witnesses
Helge H. M. may
Chas. S. Hyer
Inventor
William F. Bateman
By Clarence A. Bateman
Attorney

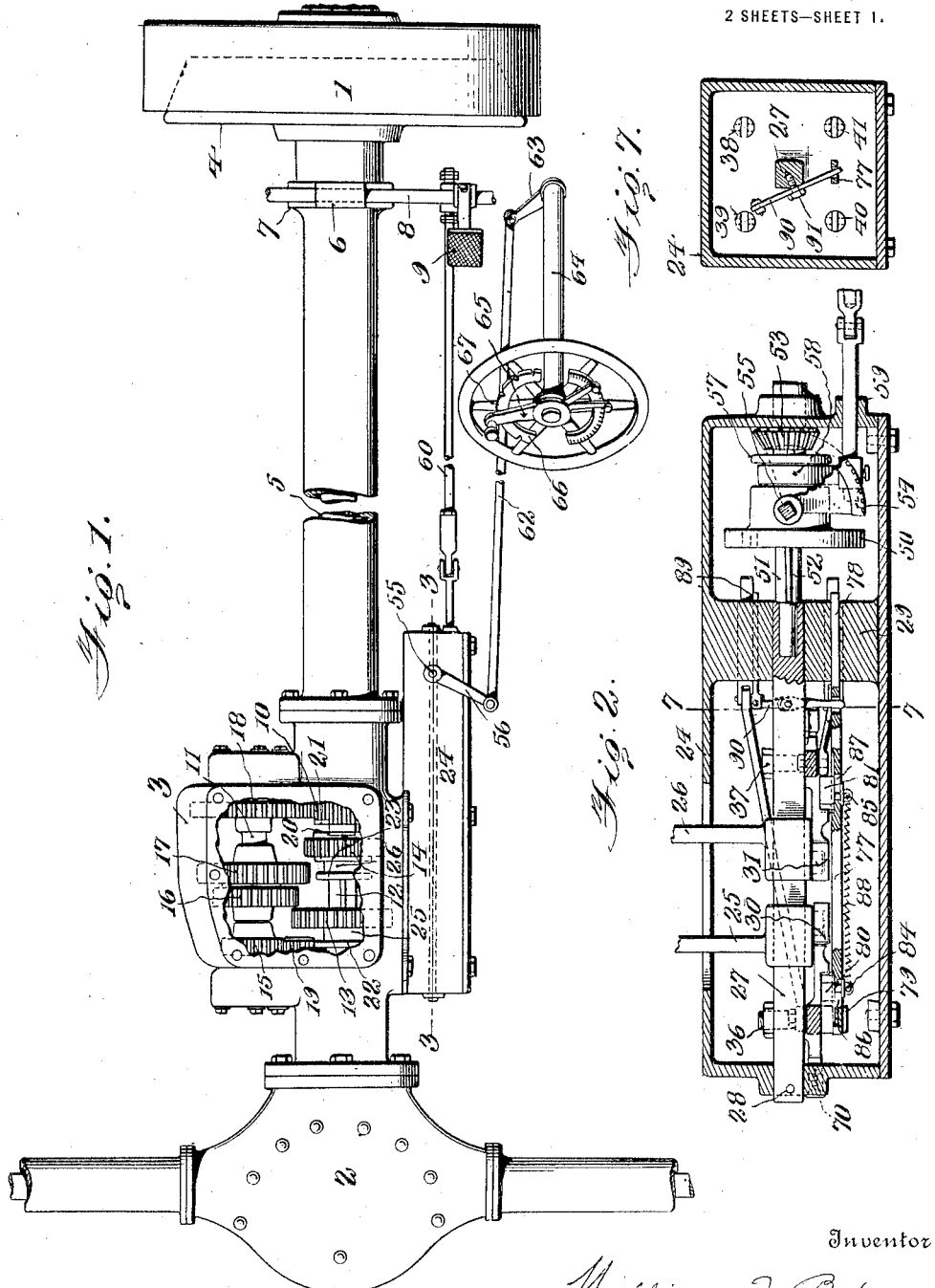

UNITED STATES PATENT OFFICE.

WILLIAM F. BATEMAN, OF WASHINGTON, DISTRICT OF COLUMBIA, ASSIGNOR, BY MESNE ASSIGNMENTS, TO GRAY PNEUMATIC GEAR SHIFT COMPANY, OF CHICAGO, ILLINOIS, A CORPORATION OF ILLINOIS.

POWER-TRANSMISSION MECHANISM.

1,331,475.     Specification of Letters Patent.     Patented Feb. 17, 1920.

Application filed January 6, 1912. Serial No. 669,902.

*To all whom it may concern:*

Be it known that I, WILLIAM F. BATEMAN, a citizen of the United States, residing at Washington, in the District of Columbia, have invented certain new and useful Improvements in Power-Transmission Mechanisms, of which the following is a specification.

The present invention relates to improvements in changeable speed power transmission mechanisms, and more especially to those of the sliding gear type as used upon automobiles, and one of the primary objects of the invention is to provide means whereby the operation necessary to obtain the different speeds is greatly facilitated and the speed changes may be effected quickly, thereby insuring proper mesh or engagement of the sliding or shiftable gears with the coöperating gears of the transmission mechanism, avoiding injury or strain to the transmission mechanism, and enabling the changes to be made immediately and with certainty.

Another object of this invention is to provide controlling and operating means for transmission mechanisms whereby the gear change, after being selected, is effected in predetermined relation to the clutch, such means being in the preferred embodiment of the invention connected to the clutch-operating pedal or member in such a manner that the gear change will be effected when said pedal or member has been operated to disengage the clutch, and, hence, liability of injury to the transmission mechanism due to an attempt to engage or disengage the shiftable or sliding gear while the clutch is engaged, is avoided.

Another object of the invention is to provide means whereby any desired speed may be readily and easily selected by adjustment of a suitable lever or equivalent device; disengagement of the clutch will then effect automatically the corresponding gear change in the transmission mechanism, and reengagement of the clutch will establish a driving connection between the motor and the transmission mechanism, the difficulties and objections incident to the operation of a lever for shifting the gears of the transmission mechanism being obviated. The gear-selecting handle or device is preferably mounted on the steering column and adjacent to the steering wheel, and the gear-shifting means is preferably connected to the clutch-operating pedal in order to enable the operator to better control the operation of the automobile, and so that the gear-selecting lever or device does not obstruct the door or floor thereof.

A further object of the invention is to provide means for locking or retaining the shiftable gear or gears in proper position and permitting the same to be shifted at the proper time, locking means being preferably employed which is controlled automatically by the gear-shifting means whereby improper displacement of the gears is prevented.

To these and other ends, the invention consists in certain improvements, and combinations and arrangements of parts, all as will be hereinafter more fully described, the novel features being pointed out particularly in the claims at the end of the specification.

In the accompanying drawings:—

Figure 1 is a plan view of a portion of an automobile embodying the present invention;

Fig. 2 represents a horizontal section on the line 2—2 of Fig. 3;

Fig. 3 represents an enlarged vertical section on the line 3—3 of Fig. 1, the full lines showing the parts in neutral position, and the dotted lines showing certain of the parts shifted to effect one of the gear changes;

Fig. 4 is a face view of the gear-selecting and shifting disk or member;

Fig. 5 is a detail sectional view of one of the gear-shifting pins or plungers;

Fig. 6 is a perspective view of the gear-selecting and shifting disk or member and the coöperative shifting pins or plungers; and Fig. 7 represents a section on the line 7—7 of Fig. 2.

Similar parts are designated by the same reference characters in the several views.

The present invention is applicable to power transmission mechanisms for various purposes, and it is particularly adapted to fulfil the requirements of transmission mechanisms for automobiles and especially those of the sliding gear type whereby the objects hereinbefore described are attained. One embodiment of the invention is shown in the drawing and will be hereinafter described, but it is to be understood that the invention is not necessarily limited to this particular embodiment, as changes may be made in the construction and relative arrangement of the parts without departing from the essential features of the invention.

In the accompanying drawing, 1 designates the fly-wheel of the usual motor or engine, 2 represents a portion of the housing for the rear axle to which the driving wheels are connected, and 3 designates a changeable speed transmission mechanism which is adapted to connect the motor to the rear axle through the medium and under the control of a clutch 4, the latter being operatively connected to a driving shaft 5. In the present instance, the clutch coöperates with the motor or engine fly-wheel under the action of springs, as usual, and its engagement and disengagement with respect thereto is controlled by the usual fork 6 which coöperates with a grooved clutch-shifting collar 7, the fork being connected to a suitably mounted rock shaft 8 and the latter is preferably operated to cause engagement and disengagement of the clutch by a clutch pedal 9. The transmission mechanism shown in the present instance is of the ordinary selective sliding gear type and embodies generally a casing or housing which receives the rear end of the clutch-controlled driving shaft 5, the latter having a pinion 10 fixed thereon, and a countershaft 11 is also journaled in the transmission mechanism casing. A propelling shaft 12 is also mounted in the transmission mechanism casing in a well known manner, the rear end of this shaft being operatively connected to the differential gear of the rear axle, and said shaft has the sliding or shiftable gears splined thereon. Different types of sliding gear transmission mechanism may be used as well as those for different speed changes, the transmission mechanism shown being adapted for three speeds forward and a reverse, the shaft 12 being provided with two sliding gears 13 and 14 and the countershaft having a set of four gears 15, 16, 17 and 18 fixed thereon, an idler or intermediate gear 19 meshing with the gear 15 and the gears 10 and 18 coöperating to transmit motion to the countershaft from the driving shaft 5. Engagement of the gear 13 with the gear 16 will produce the first or slow speed forward, while engagement of the gear 13 with the gear 19 will produce a reverse motion of the shaft 12. Engagement of the gear 14 with the gear 17 will produce a second or higher speed forward, and the high speed is effected by directly connecting or coupling the gear 14 to the pinion 10, the opposed or meeting faces of the gear 14 and the pinion 10 being provided for this purpose with clutch jaws 20 and 21 which engage and couple the shafts 5 and 12 when the gear 14 is shifted forward or toward the right in Fig. 1. The engagement of the gears 13 and 14 with the coöperative gears is effected by sliding or shifting these gears axially of the shaft 12 on which they are splined, grooved collars 22 and 23 being provided for these gears for such purposes. These gears 13 and 14 are shown in neutral position or disengaged relation to their coöperating gears in Fig. 1.

Experience has demonstrated that the sliding gears can be easily shifted to give the different speeds if the shift is made quickly after the clutch is disengaged for the reason that such gears are then revolving at or about the same speed as the gears with which they are to mesh, but it is difficult for many operators to shift the gears quickly owing to the inconvenience of manipulating the commonly used hand-operated gear-shifting lever. Damage to the gear teeth also results frequently owing to attempts to engage or disengage the gears while the clutch is engaged, either partially or completely. These difficulties and objections are obviated by the present invention, and, moreover, the operation of mechanism of this character, even by unexperienced operators, is greatly facilitated.

According to the present embodiment of my invention, a casing or housing 24 is attached to or formed as a part of the transmission mechanism casing and incloses the gear-selecting and shifting mechanism, the shifting devices for the gears 13 and 14 embodying, in this instance, arms 25 and 26 which are forked and coöperate with the collars 22 and 23 of the respective sliding gears, and these arms are slidable longitudinally on a supporting bar 27, the latter being preferably square or of other angular form and is suitably fixed in one end of the casing 24, as for example, by a pin 28 to prevent longitudinal movement thereof, the opposite end of such bar being supported by a guide 29 in which it enters and rests. An actuating device is provided for each gear-shifting arm whereby the respective gear is set in neutral or either of its driving or operative positions, a pair of such actuating devices being shown in the present instance for the gear-shifting arms 25 and 26. Different constructions may be adopted for these actuating devices, a pair of cams 30 and 31 being shown in the drawing having cam slots 32 and 33 which coöperate respectively with rollers or projections 34 and 35 borne by the hubs of the corresponding gear-shifting arms 25 and 26, and the same cams are pivotally mounted on the bar 27 by the bolts 36 and 37. Rotation of each of these cams on its axis will cause the respective sliding gear to be shifted in reverse directions into different operative positions owing to the eccentric formation of the cams, and the sliding gears will occupy neutral or inoperative positions when their corresponding cams occupy intermediate positions. Fig. 3 shows in full lines both cams in intermediate positions to set the sliding gears in neutral or inoperative positions, while the dotted lines in this figure show the cam 30 operated to set the sliding gear 13 for reverse motion.

In the present construction, a set of actuators are employed corresponding in number to the number of gear shifts to be made, there being four shifts in the type of transmission mechanism shown and hence a set of four actuators 38, 39, 40 and 41 are used, these actuators being grouped concentrically and slidable longitudinally in bores formed in the guide or support 29. These actuators are connected in pairs to the corresponding cams whereby operative movements of the actuators of a pair will cause reverse movements of the cam to which they are connected, the actuators 38 and 39 being connected by links 42 and 43 to the arms 44 and 45 which project in opposite directions from the axis of the cam 30, and the actuators 40 and 41 are operatively connected by similar links 46 and 47 to the oppositely projecting arms 48 and 49 on the other cam 31. These actuators or portions thereof project forwardly beyond the forward face of the guide 29 and while either or both of the cams occupies a central position to set the corresponding sliding gear in neutral position, the actuators connected to such cam or cams project equal distances, whereas operation of a cam to shift the corresponding gear in one of its operative positions is effected by pushing one of the actuators in one direction and permitting the other actuator of the same pair to move in an opposite direction.

The present invention provides a relatively simple and effective gear selector and shifter to operate the appropriate actuator to effect each desired gear change, it embodying in the present instance a disk or head 50 which is rotatable to set it for the desired gear change and is reciprocatory to effect the gear change for which it is set. For convenience, this disk is shown splined on a setting shaft 51, one end of this shaft being journaled in the adjacent end of the bar 27 and it is fitted with a longitudinally extending key 52 which operates in a keyway formed in the hub of the disk, whereby the latter may reciprocate on said shaft and will rotate when the shaft is rotated. Any suitable means may be used to rotate the shaft and disk to set the latter for the desired gear change and to reciprocate the disk to produce the gear change or shift for which it is set, the shaft 51 in the present instance having a bevel pinion 53 keyed or otherwise fixed thereon, and a bevel gear segment 54 coöperates with the pinion and is fixed to a stud shaft 55, the latter being journaled in and extending through the casing 24 and has an operating arm 56 fixed thereon. The selecting and shifting disk is shown provided with a grooved collar 57 and a coöperating shifting fork 58, the latter being fixed on an actuating rod which slides through a bearing 59 in the end of the casing 24 and is operatively connected to a rod 60.

The face of the gear-selecting and shifting disk which coöperates with the actuators is preferably a plane surface, and a clearance opening, recess or notch 61 is formed in the disk which, when in alinement with any one of the actuators, will permit such actuator to move toward the disk as the latter approaches the actuators, thereby permitting the other actuator of the same pair and which receives a thrust from the disk to operate and effect the gear shift, as shown in Fig. 6. In order to facilitate the gear-shifting operation and to enable the operator to produce the gear change or shift quickly, I prefer to operatively connect the gear-selecting and shifting disk to the usual clutch-controlling pedal or member whereby operation of such pedal or member to disengage the clutch will also serve to produce the gear shift, the operation then being not only easy and quick, but there is no danger of shifting the gears while the clutch is engaged, either wholly or partially. For this purpose, the rod 60 is operatively connected to an arm 9ᵃ on or connected to the clutch pedal 9. It is also advantageous to set the selecting and shifting disk by a hand lever or part on the steering column, as the selecting of the gears may then be made more conveniently, the operator will have better control of the mechanism, and the well known objections to the use of the commonly used gear-shifting lever are avoided. Preferably, the operating arm 56 is connected by a rod 62 to a crank arm 63 at the bottom of the ordinary steering column 64, and this crank arm may be connected by a common form of sleeve in the steering column to a hand-operated setting lever 65 at the top of the column and preferably at the upper side of the steering wheel as shown, a sector 66 being provided having a suitable number of notches 67 to coöperate with an appropriate dog on the setting lever and to position and retain the latter in the neutral and the different gear-shifting positions. As this setting lever merely selects the desired gear change, the gear shift being effected by the pedal, it may be operated easily. It is to be understood, however, that the setting lever may be located at any other convenient position if desired. As the gear-selecting and shifting disk is operatively connected to the clutch pedal, such disk will move toward the actuators whenever the clutch pedal is pressed to disengage the clutch. In order to permit this movement of the disk without being obstructed by any of the actuators and also to produce a quick gear shift which will not injure the gears, a yieldable or resilient action is provided, this action being preferably obtained by employing spring-operated actuators, each actuator in the present instance being provided with a longitudinally movable pin 68 and a compression spring 69 which acts to press the pin toward the face of the selecting and shifting disk, the springs for the different actuators being of the same power or strength. When both cams are in intermediate position as shown by the full lines in Fig. 3, the pins on all the actuators project equal distances toward the selecting and shifting disk, and if the latter then makes a full stroke toward them, the springs will yield and permit the pins to be moved by the disk without obstruction, and both of the sliding gears will then be in neutral or non-operative positions. When the disk is rotated to bring the recess or notch 61 thereof into alinement with one of the actuators, the pin of the other actuator of the same pair and connected to the same gear-shifting cam will receive a thrust from the disk as the latter is moved toward the dotted line position shown in Fig. 3, and this actuator will be pushed to turn the respective cam and effect the proper gear shift, the companion actuator of the same pair passing freely into or through the notch 61 of the disk so that this actuator receives no pressure, the spring-operated pins of the remaining actuators yielding equally while their respective cam remains in neutral or non-shifting position as shown in Figs. 3 and 6.

In order to hold or retain the sliding gears in neutral or non-operative position until the proper time for them to shift, the cams may be provided with controlling pawls, spring-pressed pawls 70 and 71 being shown in the present instance which are arranged to coöperate with sectors 72 and 73 on the respective cams, each sector having a central notch 74 which the pawl engages to retain the cam in neutral position and sloping surfaces 75 and 76 having shoulders at the ends whereby the pawl after being disengaged from the central notch operates upon one or another of these sloping surfaces to assist in the throw of the cam, and when the cam has been thrown to completely shift the gear, the spring-operated pawl will operate to prevent accidental shifting of the cam due to vibration or other causes.

It will be desirable or necessary in some cases, and particularly where the transmission mechanism is mounted on the rear axle casing, to provide locking means for effectively controlling the shiftable gears whereby accidental displacement of these gears, particularly from neutral or non-operative position, is prevented, the locking means being controlled and released automatically by the gear-shifting disk or member. Locking means of different constructions may be employed for accomplishing this result, that shown in the present instance embodying a reciprocatory bar 77 having a pin 78 on its forward end which slides in and projects through the guide 29, and the rear portion or end of this bar is suitably supported as by a guide 79. This bar is provided with a pair of reversely arranged locking pawls or dogs 80 and 81 which coöperate with suitably notched sectors 82 and 83 so as to lock the respective cams in neutral or in either of the gear-shifting positions. Studs 84 and 85 fixed to these pawls extend through slots 86 and 87 in the locking bar and are connected by a tension spring 88 which operates normally to retain both pawls in locking engagement with the respective sectors. Movement of the locking bar in one direction, however, will bring the end of the slot thereof against the stud of the respective pawl and will retract such pawl while the other pawl remains in locking position to hold its respective cam in neutral position, while movement of the locking bar in a reverse direction will produce a reverse action on the pawls and will unlock one cam and retain the other cam in neutral position. Movement of the locking bar in one direction to unlock the cam 30 is effected by engagement of the gear-shifting disk 50 with the pin 78 on the locking bar, while movement of the locking bar in a reverse direction to unlock the cam 31 is effected by engagement of the gear-shifting disk 50 with a second reciprocatory pin 89 which slidably operates in and projects beyond the forward face of the guide 29 and is connected to the locking bar 77 by a rocking lever 90 which is fulcrumed on a pivot 91.

In operation, one of the cams should be locked in neutral position when the other cam is operated to shift its gear into either of its operative positions, and when both cams are in neutral position they should be locked in such position to prevent accidental shifting of the gears due to vibration or other causes. In the present instance, the operative face of the gear-selecting and shifting disk 50 is formed with a segmental groove or recess 93 which either of the pins 78 and 89 which are placed concentrically for this purpose, may engage, this groove being so shaped and placed with respect to said pins that the pin 89 will enter the groove and the pin 78 will engage the plane face of the disk as the latter advances, the cam 30 being thereby unlocked to permit gear-shifting operation thereof in either direction while the cam 31 will remain locked, and conversely, when the gear-selecting and shifting disk is set and operated to throw the cam 31 in either direction to effect a gear change, the pin 78 will then enter the groove 93 and the other pin 89 will bear on the plane or ungrooved portion of the disk and the cam 31 will then be unlocked while the other cam 30 will remain locked with its respective gear in neutral position. The middle locking notch 92 of each cam is preferably deeper than the other notches and such middle notches and their coöperating locking pawls are preferably so shaped as to permit a positive locking action to be produced to retain the cams in neutral position, the other notches being preferably shallower to enable the pawls to yield and unlock the cams when the latter are to be shifted from their operative positions. The springs of the actuators enable the gear-shifting disk to advance until it has unlocked the appropriate cam in the manner above described, whereupon the actuator will operate to produce a quick shift of the gear with accelerative movement derived from the power stored in the compressed spring of the respective actuator and under a spring pressure which will facilitate engagement of the gear teeth and prevent damage thereto. During the gear-shifting operation of one of the cams, the other cam remains in neutral position, the springs of the actuators connected to this cam being compressed during the gear-shifting operation of the disk.

In operation, in order to produce a gear shift, it is only necessary for the operator to set the hand lever 65 according to the desired gear shift, the disk 50 being thereby rotated by the connections hereinbefore described until the notch 61 thereof is in line to permit the appropriate actuator to pass therethrough, the companion actuator of the same pair and connected to the same cam being then opposite to the solid or plane face of the disk. The gear shift is effected by forward pressure on the clutch pedal, the clutch being thereby disengaged and the disk 50 is pushed rearwardly exerting a thrust upon the actuator which is the companion of the one in register with the notch of the disk, the rearward movement of the disk also unlocking the particular cam which is to be operated. Release of the pressure on the clutch pedal permits the same to return to normal position under the action of the usual clutch springs, and this movement of the pedal engages the clutch to transmit motion according to the selected speed. The clutch may obviously be engaged and disengaged as occasion may require without producing a gear change, and it is obvious that any desired gear change may be selected easily and made quickly and with facility without requiring skill on the part of the operator.

This invention is, of course, applicable also to that type of transmission mechanism where slidable or shiftable clutches are used to effect the different gear changes instead of the slidable gears of the type shown, although the present invention is particularly advantageous when used in connection with transmission mechanisms of the sliding gear type as it avoids mutilation or breakage of the gear teeth.

The setting of the gear-selecting and shifting disk or member 50 to obtain the different desired gear changes is represented diagrammatically in Fig. 4, the disk being shown in this figure for a neutral condition of the gear-changing elements, as the clearance notch 61 is located out of alinement with all the actuators the positions of which are represented by the dotted circles. Operation of the pedal to engage and disengage the clutch will then only press back the spring pins of all the actuators. When the disk is rotated in a clockwise direction to bring the notch therein in alinement with the upper left hand actuator, a thrust action of the disk toward the actuators will change the gears of the transmission mechanism for reverse motion, and rotation of the disk in a reverse direction will bring it successively into positions to produce the first, second and third forward speeds as desired. Any of these gear changes may be selected as desired, and the setting of the disk for different selected gear changes may be made without the necessity of disengaging the clutch, although the gear change is not made until after the clutch is disengaged.

The present invention provides not only an interlocking mechanism to retain one of the shiftable gear-changing elements in neutral or non-operative position while another gear-changing element is being shifted or is in gear, or in other words, to interlock the gear-changing elements so that only one of them at a time may occupy an operative position, but it also provides means for insuring the return of one gear-changing element to neutral or non-operative position before another gear-changing element is shifted into gear, for which purpose each gear-shifting device is locked in neutral position until after any other gear-changing element has been returned to neutral or nonoperative position by the advance of the gear-shifting member, the gear-shifting operation being thus delayed by a yield of the spring of the respective actuator, and hence, it is impossible for two gear-changing elements to be in operative position simultaneously, thus avoiding serious damage which would otherwise result to the transmission mechanism. Preferably, means is provided for the withdrawal of each gear-changing element from operative position should such element stick, the gear-shifting disk or member in the present instance being arranged to fully compress the respective spring and to abut directly against the rigid end of the appropriate actuator to positively withdraw the gear-changing element from engaging position.

I claim as my invention:—

1. The combination of a transmission mechanism embodying a shiftable gear changing element, a gear selecting and shifting member, a clutch adapted to drive the transmission mechanism, means operative to disengage said clutch and to actuate said member to produce a selected gear change, and means for locking the gear changing element in non-operative position.

2. The combination of a transmission mechanism embodying a shiftable gear changing element, a gear selecting and shifting member, a clutch adapted to drive the transmission mechanism, means operative to disengage said clutch and to actuate said member to produce a selected gear change, and means for retaining the gear changing element in different shifted positions.

3. The combination of a transmission mechanism embodying a shiftable gear changing element, a gear selecting and shifting member, a clutch adapted to drive the transmission mechanism, means operative to disengage said clutch and to actuate said member to produce a selected gear change, and means controlled by said member for locking said element in inoperative position.

4. The combination of a transmission mechanism embodying a shiftable gear changing element, a gear selecting and shifting member, a clutch adapted to drive the transmission mechanism, means operative to disengage said clutch and to actuate said member to produce a selected gear change, and means controlled by said member for retaining said element in different shifted positions.

5. The combination of a transmission mechanism embodying a plurality of shiftable gear changing elements, a gear selecting and shiftable member, means for setting said member to effect different gear changes by said element, and means controlled by said member for retaining said elements in predetermined relations.

6. The combination of a transmission mechanism embodying a plurality of shiftable gear-changing elements, a clutch for driving such mechanism, a shifting member for said elements, means for setting said member to select different gear changes, and means for operating said member to effect the selected gear change and to restore any other gear-changing element to inoperative condition.

7. The combination of a transmission mechanism embodying a plurality of shiftable gear-changing elements, a shifting member for said elements, means for setting said member to select different gear changes, and means for operating said member to first restore any gear-changing element to inoperative condition and subsequently to effect the selected gear change.

8. The combination of a transmission mechanism embodying a plurality of shiftable gear-changing elements, a set of actuators connected to the respective gear-changing elements, a shifting member for said elements, means for setting said member for different selected gear changes, and means for moving said member into operative relation to all of said actuators to restore any changing element other than the one to effect the selected gear change to inoperative position and to effect the selected gear change.

9. The combination of transmission mechanism embodying a shiftable gear-changing element, a shifting member for said element, means for setting said member for different selected gear changes, and means for operating said member to produce a yielding shifting operation of said element to effect the selected gear change.

10. The combination of transmission mechanism embodying a plurality of shiftable gear-changing elements, a shifting member for said elements, yieldable actuators connected to the respective elements, means for setting said member for different selected gear changes, and means for operating said member to effect the selected gear change and causing the actuators which are not to be operated to yield and retain their respective gear-changing element in neutral or inoperative position.

11. The combination of transmission mechanism embodying a plurality of shiftable gear-changing elements, a shifting member for said elements, means for setting said member for different selected gear changes, means for operating said member to effect the selected gear change and to restore any other gear-changing element to neutral or inoperative position, and means for locking each gear-changing element in neutral or inoperative position until after any other gear-changing element has been restored to neutral or inoperative position.

12. The combination of transmission mechanism embodying a plurality of shiftable gear-changing elements, a member for shifting said elements, means for operating said member to effect different selected gear changes, and locking means for the gear-changing elements releasable to permit gear-changing operation of an element only while no other gear-changing element is in operative position.

13. The combination of transmission mechanism embodying a plurality of shiftable gear-changing elements, a member for shifting said elements, means for operating said member to effect different selected gear changes, and locking means for the gear-changing elements controlled according to the selected gear changes and releasable to permit gear-changing operation of an element only while no other gear-changing element is in operative position.

14. The combination of transmission mechanism embodying gear-changing elements, a member for operating said elements to effect different gear changes, means for setting said member for different selected gear changes, and locking means for said gear-changing elements controlled by said member and releasable to permit gear-changing operation of one of said elements only while no other gear-changing element is in operative position.

15. The combination of transmission mechanism embodying a plurality of gear-changing elements, a member for operating said elements to effect different gear changes and also to restore any other gear-changing element to inoperative position, and locking means operative to delay a gear-changing operation until any other gear-changing element has been restored to inoperative condition.

16. The combination of transmission mechanism embodying a plurality of gear-changing elements, means for selecting and operating said elements, and interlocking means controlled by said selecting and operating means for preventing more than one of said elements occupying an operative position at the same time.

17. In a device of the class described, in combination with a plurality of members each adapted to be moved between two different positions corresponding with a different speed to be used, a selector device movable between different positions one corresponding to each of the speed positions of the first mentioned members, and a mechanism operatable only with the assistance of the selector device adapted when the selector is in position for a given speed to produce an accelerative speed changing movement of the appropriate member by stored power.

In testimony whereof I have hereunto set my hand in presence of two subscribing witnesses.

WILLIAM F. BATEMAN.

Witnesses:
   David W. Gall,
   Clarence A. Bateman.